US006941829B1

(12) United States Patent
Long

(10) Patent No.: US 6,941,829 B1
(45) Date of Patent: Sep. 13, 2005

(54) LEAK DETECTOR

(76) Inventor: Scott J. Long, 302 Brooks Pl., Bellevue, NE (US) 68005

(*) Notice: Subject to any disclaimer, the term of this patent is extended or adjusted under 35 U.S.C. 154(b) by 100 days.

(21) Appl. No.: 10/629,964

(22) Filed: Jul. 30, 2003

(51) Int. Cl.$^7$ .............................................. G01D 21/00
(52) U.S. Cl. .................................................. 73/866.5
(58) Field of Search ........................... 73/29.01, 20.02, 73/335.01, 335.02, 335.03, 335.04, 335.05, 73/73, 74, 75, 76, 77, 866.5; 340/604, 605

(56) References Cited

U.S. PATENT DOCUMENTS

| 2,127,538 | A | * | 8/1938 | Seiger ..................... 200/61.05 |
|---|---|---|---|---|
| 2,249,867 | A | | 7/1941 | Snelling ...................... 73/335 |
| 3,100,691 | A | | 8/1963 | Jones ........................... 23/253 |
| 3,225,555 | A | | 12/1965 | Chatlos ....................... 62/129 |
| 3,770,002 | A | * | 11/1973 | Brown ........................ 137/312 |
| 4,104,905 | A | * | 8/1978 | Zachary ......................... 73/40 |
| 4,106,428 | A | | 8/1978 | Matthiessen ............. 116/114 P |
| 4,216,980 | A | | 8/1980 | Shreve ......................... 285/13 |
| 4,418,712 | A | * | 12/1983 | Braley ......................... 137/312 |
| 5,023,560 | A | * | 6/1991 | Gallagher .................... 324/664 |
| 5,339,676 | A | | 8/1994 | Johnson ......................... 73/40 |
| 5,621,391 | A | * | 4/1997 | Elseth ......................... 340/604 |
| 6,025,788 | A | * | 2/2000 | Diduck .................. 340/870.16 |
| 6,175,310 | B1 | * | 1/2001 | Gott ............................ 340/605 |
| 6,321,591 | B1 | | 11/2001 | Breunsbach et al. ....... 73/53.01 |
| 6,484,564 | B1 | | 11/2002 | Hayashida ..................... 73/40 |
| 6,524,857 | B1 | | 2/2003 | Perkins .......................... 436/3 |
| 6,526,807 | B1 | * | 3/2003 | Doumit et al. ........... 73/40.5 R |
| 6,639,517 | B1 | * | 10/2003 | Chapman et al. ........... 340/605 |
| 6,731,215 | B2 | * | 5/2004 | Harms et al. ............... 340/605 |
| 2002/0062114 | A1 | | 5/2002 | Mural et al. ........... 604/385.01 |
| 2003/0096107 | A1 | * | 5/2003 | Birkholz et al. ............. 428/343 |

FOREIGN PATENT DOCUMENTS

| JP | 58206880 | 6/1985 |
|---|---|---|
| JP | 63202418 | 2/1990 |
| JP | 07153103 | 1/1997 |

\* cited by examiner

*Primary Examiner*—Charles Garber
(74) *Attorney, Agent, or Firm*—Thomte, Mazour & Niebergall; Shane M. Niebergall

(57) ABSTRACT

A leak detection device is provided with an elongated handle having a head member disposed at one end. The device has a low profile for easy insertion beneath an appliance. The head member is configured to be easily oriented around wheels or other supports while positioning a testing arm below the water line connection. The device is adaptable for use with appliances having different configurations of wheels and can easily be reused. The function of the device lends itself to simple and inexpensive manufacture.

19 Claims, 4 Drawing Sheets

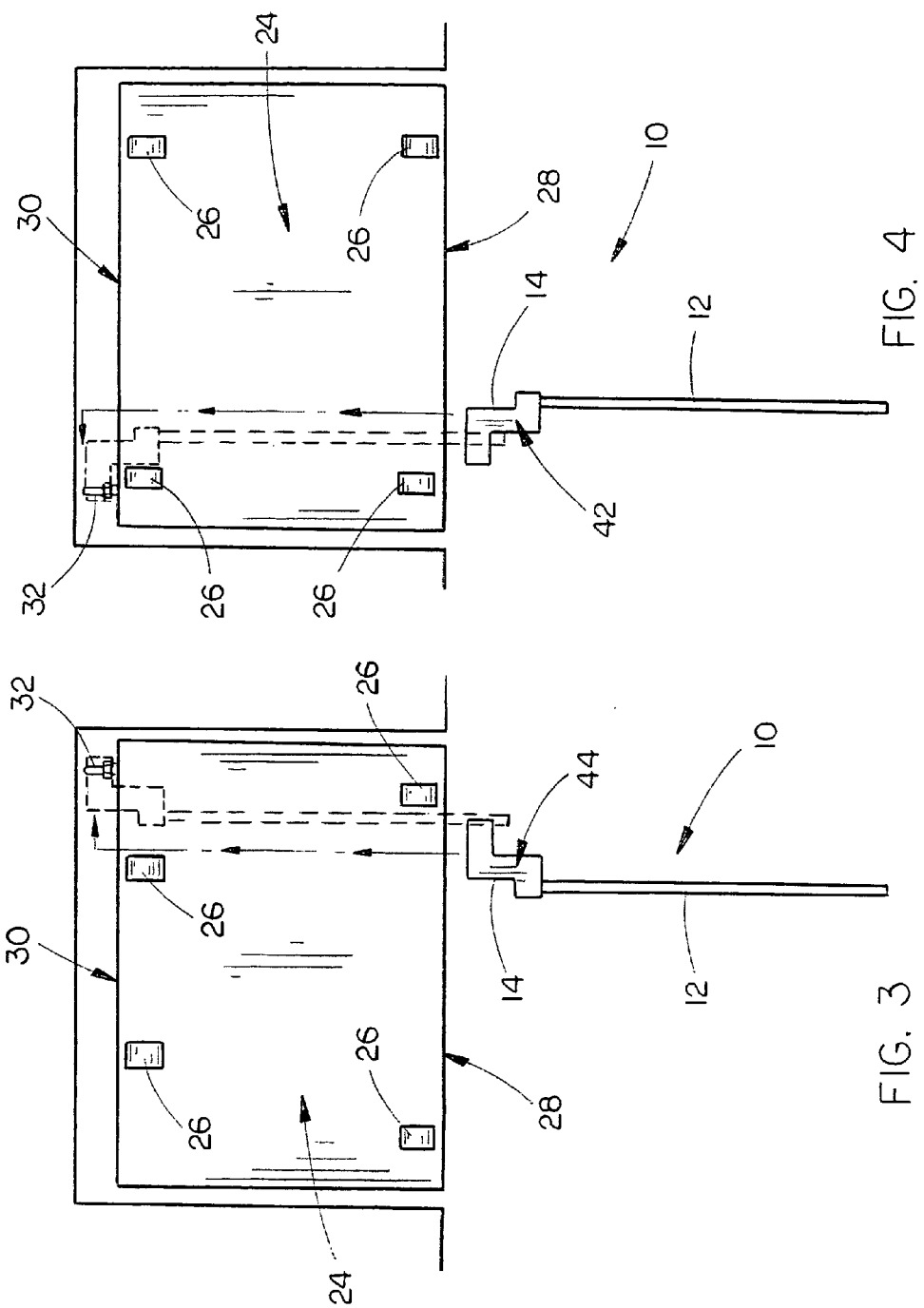

LEAK DETECTOR

BACKGROUND OF THE INVENTION

The present invention relates to leak detection devices and more particularly to a manual leak detector that is adaptable for use in detecting water connection leaks on appliances having different wheel or support configurations.

DESCRIPTION OF THE PRIOR ART

The advent of icemaker and water taps for refrigerators greatly increased the level of convenience in the kitchen. These systems are typically coupled to a water line so that the system can function automatically. The water line is oftentimes connected to the refrigerator at the lower end of its back side. Once the water line is connected, the installer moves the refrigerator into its final position against the wall. Wheels or other similar supports extend from the bottom of the refrigerator and help in moving the refrigerator into and out of position for installation and maintenance. However, when moving the refrigerator into position, it is common to pinch or otherwise damage the water line connection at or near the point it enters the refrigerator. When this occurs, water may slowly begin to leak from the water line connection unbeknownst to the installer. The gradual leak continues until water has permeated the floor beneath the refrigerator and the adjacent walls. Before the homeowner realizes that the leak has occurred, thousands of dollars of damage can be caused. This situation can also occur during the installation of many other appliances, such as clothes washers, dishwashers, stand-alone icemakers, etc.

There is currently no industry standard or guidelines for the installer to follow for checking for leaks from the water line connection after an appliance has been installed. To be sure, the orientation of the appliance in most household settings does not provide the installer with easy access to the rear panel of the appliance, where the water line connection is typically located. It is also just as common that the position of the appliance within custom cabinetry or its placement next to walls and built-in cabinetry deny the installer easy access to either side of the appliance. Moving the appliance back out of position to check the water line connection is not an easy task; but more importantly, the installer risks damage to the floor coverings by moving the appliance back and forth, not to mention the fact that the additional movement places further risk of damage to the water line connection. Accordingly, installers are often left with the only available option of hoping that they can look beneath the appliance with a flashlight at different angles to see if any water has begun to leak from the connection. However, as shown in FIGS. 3 and 4, the wheel placement may be different from appliance to appliance. Moreover, the placement of the water line connection is typically at a location that is behind one or more wheels. Accordingly, the installer is provided with little opportunity to see the area immediately surrounding the water line connection.

Some prior art devices have been developed to sense the presence of moisture in certain areas and emit an alarm. Certainly, such a system would work for detecting water leaks from the water line connector of an appliance. However, such a system is typically expensive and complex. Moreover, after the first couple of days, if a leak has not occurred, one is not likely to occur unless the refrigerator is moved out of its final position for maintenance and then moved back into position. Due to the infrequency of moving refrigerators into and out of position, expensive and/or complex leak detection systems are highly impractical.

Accordingly, what is needed is a relatively cheap and inexpensive leak detection system that is easy to implement by an appliance installer or a homeowner.

SUMMARY OF THE INVENTION

The leak detection device of the present invention is generally provided with an elongated handle and a head member disposed at one end of the handle. The handle and head member have low profiles to permit them to be easily slid beneath an appliance from its front side. The head member is provided with a testing arm that preferably extends away from the long axis of the handle. Accordingly, the device can be slid beneath the refrigerator until the testing arm has passed an obstacle, such as a wheel, that is placed under the refrigerator in front of the water line connection. The user then simply slides the device laterally to position the testing arm below the water line connection. Once in position, the length of the handle can be trimmed so that the handle does not protrude from beneath the appliance. This permits the unit to be left in position for hours, days, or longer. After any duration of time, the individual simply removes the device from beneath the refrigerator and checks the head member for moisture.

The head member is also provided with an extension arm that moves the center line of the head member away from the long axis of the handle. In this offset position, a user is able to first move the testing arm around a wheel placed near the front of the appliance and then slide the unit to the rear of the refrigerator, placing the testing arm below the water line connection while avoiding the awkward positioning of wheels positioned to the rear of the refrigerator. Alternate embodiments may include the disposition of water soluble inks on the head member to enhance the visual evidence of moisture on the head member.

It is therefore a principal object of the present invention to provide a leak detection device that quickly and easily checks for leaks from the water line connection of an appliance.

A further object of the present invention is to provide a leak detection device that is adaptable for detecting leaks from appliances having various wheel/support configurations.

Still another object of the present invention is to provide a leak detection device that indicates the presence of leaks even if the fluid has subsequently evaporated.

Still another object of the present invention is to provide a leak detection device that may be left in a leak detecting position indefinitely.

A further object of the present invention is to provide a leak detection device that can be quickly and easily placed into a leak detection position and later removed for storage at another location.

Yet another object of the present invention is to provide a leak detection device that is reusable.

Still another object of the present invention is to provide a leak detection device that is relatively simple and inexpensive to manufacture.

These and other objects will be apparent to those skilled in the art.

BRIEF DESCRIPTION OF THE DRAWINGS

FIG. 3 depicts an embodiment of the leak detector of the present invention as the same could be used to detect a leak from a water supply line of an appliance having a particular configuration of refrigerator supports;

FIG. 4 depicts the leak detector of FIG. 3 as the same could be used to detect a leak from a water supply line of an appliance having an alternate configuration of refrigerator supports.

DESCRIPTION OF THE PREFERRED EMBODIMENT

Figure 1:
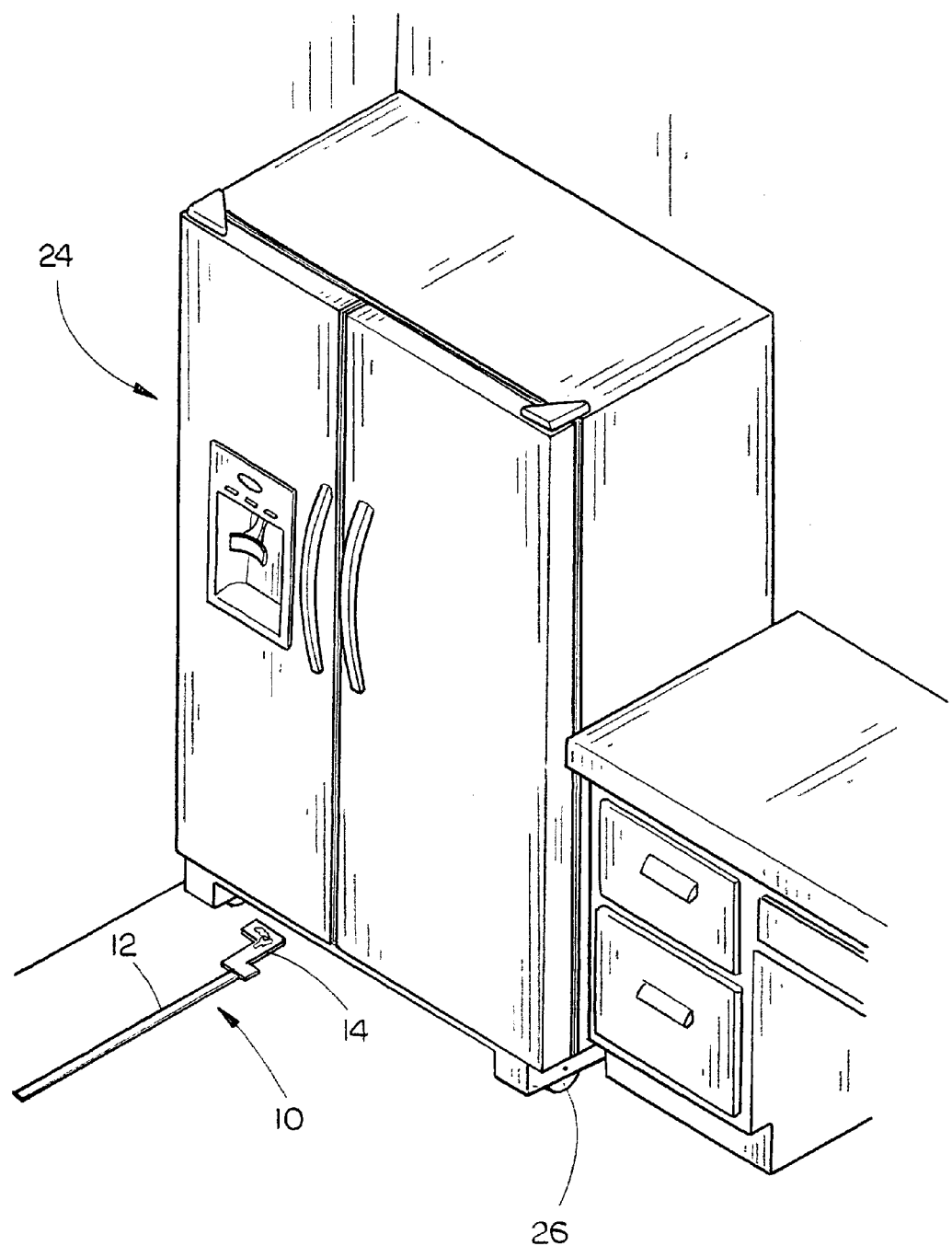
FIG. 1 is a perspective view of one embodiment of the present invention as the same could be used to detect a leak from a refrigerator.

The leak detecting device 10 of the present invention is generally depicted in FIGS. 1–4 as having a handle 12 and a head member 14. The handle 12 is preferably elongated, having a first end portion 16 and a second end portion 18. The head member 14 is provided with a rearward end portion 20 and a forward end portion 22. The rearward end portion 20 of the head member 14 is secured to the second end portion 18 of the handle 12.

Together, the handle 12 and the head member 14 are shaped to have a thin profile. This permits the device 10 to be easily slid beneath an appliance, such as the refrigerator 24, which is supported above the floor by a plurality of wheels 26. Typically, the appliance is provided with a pair of wheels 26, or other similar type of support, such as a glide or foot peg, adjacent the front side 28 of the appliance. An additional pair of wheels 26 or similar type of support is typically positioned adjacent the back side 30 of the appliance. However, the wheels 26 adjacent the back side 30 are typically positioned in one of two different arrangements in most appliances. The wheels 26 may be positioned adjacent the corners of the appliance, as depicted in FIG. 4, or the rear wheels 26 may be moved inwardly, as depicted in FIG. 3. A fluid connection line 32 extends from the back side 30 of the appliance and is typically positioned closely adjacent one of the lower corners of the back side 30.

Figure 2:
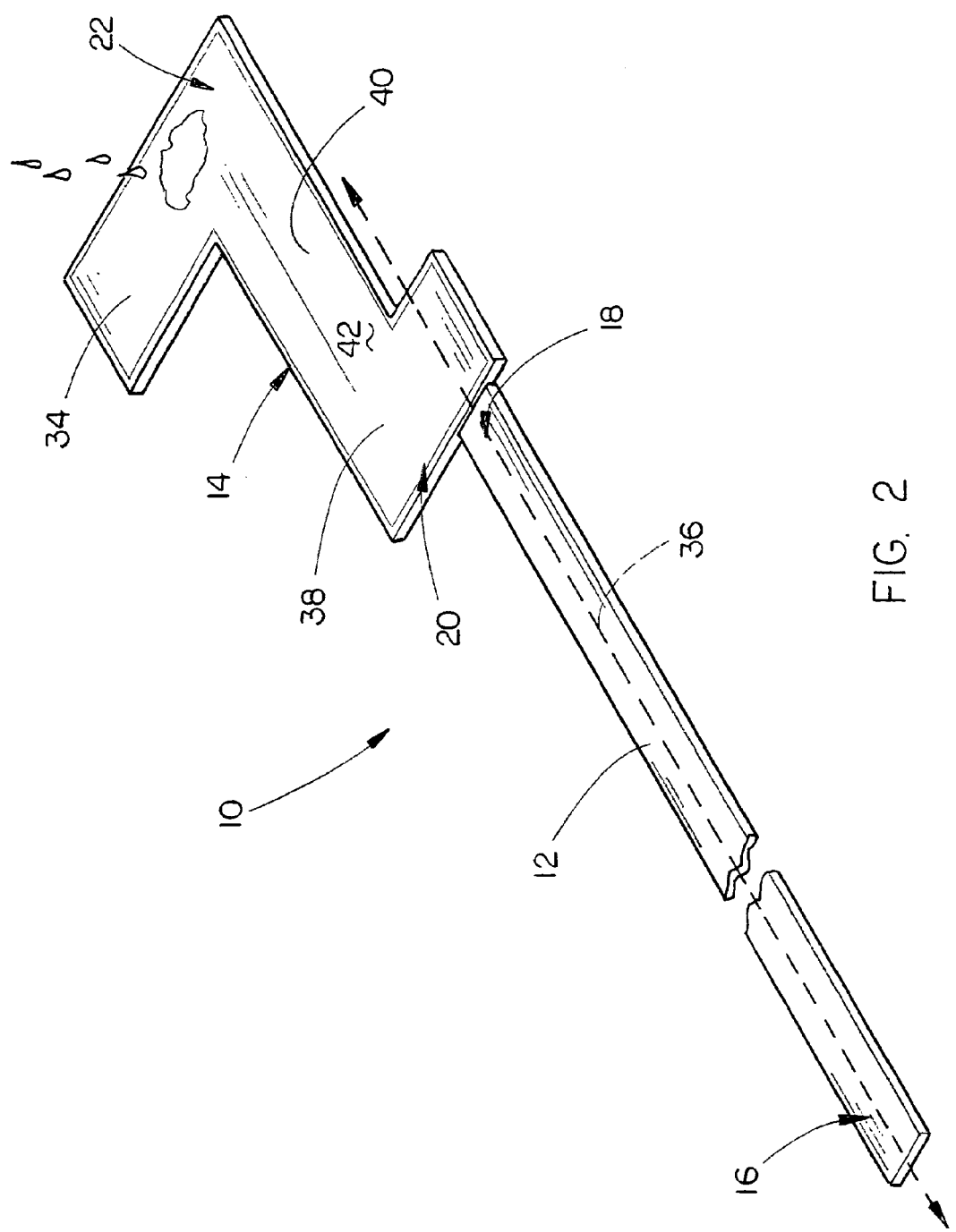
FIG. 2 is a perspective view of one embodiment of the leak detector of the present invention.

In order to test for a fluid leak from the fluid connection 32, without first moving the appliance from its position adjacent the wall, it is important to be able to get the head member 14 below the fluid connection 32. The positioning of the wheels 26 creates a challenge in attaining this goal, since an object cannot be simply slid straight from the front side 28 to the back side 30 of the appliance to position the head member 14 below the fluid connection 32, as shown in FIGS. 3 and 4. Accordingly, the head member 14 is preferably shaped to have a testing arm 34 that extends away from the long axis 36 of the handle 12. Although the testing arm 34 is depicted in FIG. 2 as extending generally perpendicular to the long axis 36 of the handle 12, it is contemplated that the testing arm 34 could extend at angles greater to or less than 90° with respect to the long axis 36. It is further contemplated that the testing arm 34 could extend outwardly from the long axis 36 in a generally arcing direction. Moreover, although the testing arm 34 is generally depicted in FIG. 2 as being formed in the forward end portion 22 of the head member 14, it is generally contemplated that the entire head member 14 could be shaped as a single testing arm 34. Extending the testing arm 34 outwardly from the long axis 36 of the handle 12 permits the user to simply slide the device 10 from the front side 28 of the appliance to the back side 30 and then simply slide the device 10 laterally until the testing arm 34 is positioned below the fluid connection 32, as shown in FIGS. 3 and 4.

The embodiment of the head member 14 depicted in FIG. 2 is provided with an extending arm 38, which like the testing arm 34 extends outwardly from the long axis 36 of the handle 12. Similarly, the extending arm 38 could extend perpendicularly to the long axis 36, and it could also be shaped to extend at any different angle or arcuate direction therefrom. The head member 14 depicted in FIG. 2 is also provided with a lengthening arm 40, which extends between the testing arm 34 and the extending arm 38. Although the lengthening arm 40 is depicted as being positioned generally parallel to the long axis 36 of the handle 12, it is contemplated that the lengthening arm 40 could be disposed at any angle with respect to the long axis 36. Together, the extending arm 38 and the lengthening arm 40 serve to position the testing arm forwardly and laterally of the second end 18 of the handle 12.

The testing arm 34 and lengthening arm 40 are preferably positioned with respect to one another so that when the lengthening arm is positioned adjacent the side of a wheel 26, as depicted in FIG. 4, the testing arm 34 is disposed to the rear of the wheel 26. This permits the testing arm 34 to "reach around" the wheel 26. The extending arm 38 and lengthening arm 40 are preferably positioned with respect to one another such that when the lengthening arm is positioned along one side of the wheel 26, the extending arm 38 is positioned in front of and along the width of the wheel 26. A combination of these arm positions permits the user to avoid the wheels 26 when they are disposed in the configuration depicted in FIG. 3. First, the user positions the testing arm 34 so that it is behind the wheel 26 adjacent the front side 28 of the appliance. This permits the device 10 to be slid straight back to the back side 30. The orientation of the extending arm 38 positions the lengthening arm 40 a sufficient distance from the wheel 26 adjacent the back side 30. The length of the lengthening arm 40 may be provided such that the testing arm would be properly disposed below the fluid connection 32 despite the fact that the positioning of the wheel 26 would not permit the extending arm 38 to advance further to the rear of the appliance.

The head member 14 generally has a first upper surface 42 and a second lower surface 44. It is these surfaces which will receive any fluid escaping from the fluid connection 32. Accordingly, it is contemplated that where the head member 14 is shaped in a manner described hereinabove, it is contemplated that the opposite sides will provide shapes that mirror each other for use in testing a fluid connection 32 located at either side of the back side 30 of an appliance as depicted in FIGS. 3 and 4. It is contemplated that the head member could formed from nearly any material, such as plastic, wood, metal or paper. However, it is preferred that the head member be formed from a heavy paper stock such as cardboard, for its ease in manufacture and shaping as well as its low cost. Moreover, such a material provides a level of fluid absorbency that will assist the user when a fluid leak is intermittent. In such a case, the leak may continue for awhile, while water is accepted by the appliance. However, the leak may temporarily stop, allowing moisture to evaporate. Accordingly, where the head member is made from a fluid-absorbing material, the fluid will tend to evaporate more slowly. Moreover, the evaporated fluid will typically leave behind evidence that the material was once wet, such as a water line and a slight disfiguration to the texture of the surface. It is further contemplated that a water soluble ink could be disposed on one or both of the surfaces 42 and 44 so that additional or enhanced visual evidence of a leak could be provided in the form of splotched ink on the head member 14.

It is contemplated that the device 10 could be used for a few days to determine the integrity of a fluid connection and then discarded. However, it is also contemplated that the device 10 could be left in position adjacent the fluid connection 32 indefinitely. In this instance, it is preferred that the handle 12 be formed of a material, such as heavy paper stock, wood or plastic. Each of these materials are easily trimmed to provide a handle 12 having a length that does not pass the front side 28 of the appliance when the device 10 is in position. This leaves the device out of sight but retains its position to be checked periodically for potentially damaging fluid leaks. This also permits the device 10 to be reused where a leak is first detected. In that instance, the device 10 is simply dried and returned to its position adjacent the repaired fluid connection 32. The device 10 could also be taken by an appliance installer from one job to the next.

Figure 5:
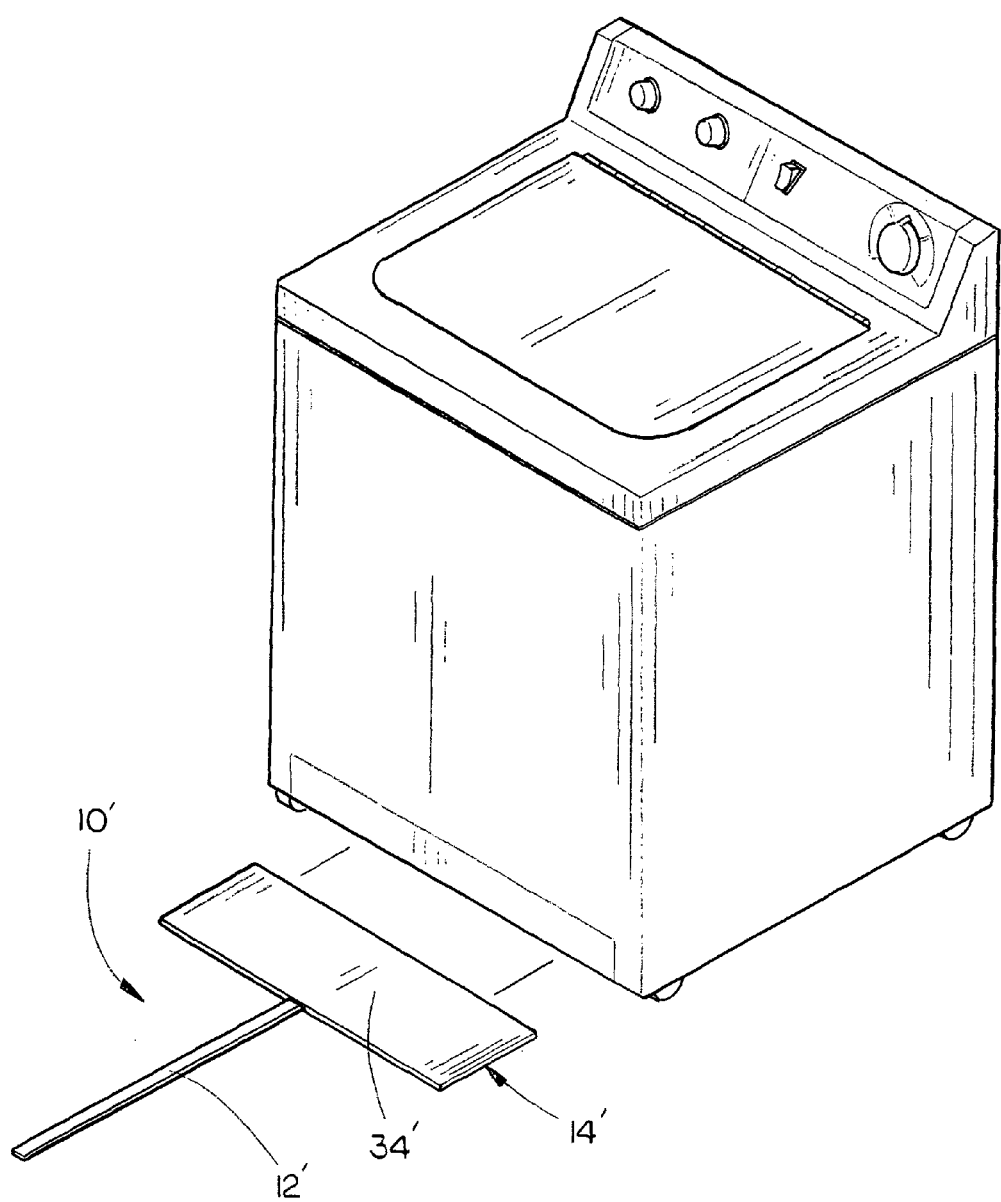
FIG. 5 is a perspective view of an alternate embodiment of the leak detector of the present invention as the same could be used to detect a leak from a clothes washer.

FIG. 5 depicts an alternate embodiment device 10', which could be used with appliances such as a clothes washer that may have a standard configuration (FIG. 4) but may have a fluid connection extending from the upper end portion of the back side of the appliance. The device 10' is provided with a handle 12' and a head member 14' that function much in the same manner as those on the device 10 described previously. However, a standard support configuration on the appliance depicted permits the testing arm 34' to be longer and extend beyond both sides of the handle 12'. The device 10' is preferably positioned between the appliance and the operating surface adjacent the wall. In this position, a fluid leak from a fluid connection anywhere on the back side of the appliance will come into contact with the testing arm 34'.

In the drawings and in the specification, there have been set forth preferred embodiments of the invention; and although specific items are employed, these are used in a generic and descriptive sense only and not for purposes of limitation. Changes in the form and proportion of parts, as well as substitution of equivalents, are contemplated as circumstances may suggest or render expedient without departing from the spirit or scope of the invention as further defined in the following claims.

Thus it can be seen that the invention accomplishes at least all of its stated objectives.

I claim:

1. A device for detecting a fluid leak from a fluid supply connection to an appliance that is supported above an operating surface by a plurality of supports, the device comprising:
   an elongated handle having a long axis that extends between first and second end portions; and
   a head member having forward and rearward end portions and upper and lower surfaces; said rearward end portion being operatively coupled to the second end portion of said handle;
   said handle and said head member being sized to be selectively disposed between the appliance and the operating surface;
   said head member being shaped to have a testing arm with a long axis that extends outwardly in different directions than the long axis of said handle so that at least a portion of said testing arm can be positioned first between the appliance and the operating surface and then below the fluid supply connection.

2. The device of claim 1 wherein the rearward end portion of said head member is shaped to form an extension arm with a long axis that extends outwardly in different directions than the long axis of said handle.

3. The device of claim 2 wherein said head member is shaped to have a lengthening arm having a long axis which extends between said extension arm and said testing arm.

4. The device of claim 3 wherein the long axis of said lengthening arm is generally spaced apart from the long axis of said handle.

5. The device of claim 3 wherein said testing arm and said lengthening arm are positioned with respect to one another so that said lengthening arm can be selectively disposed along a first side of one of the plurality of supports to position a length of said testing arm along a second rearward side of said one support.

6. The device of claim 3 wherein said extending arm and said lengthening arm are positioned with respect to one another so that said lengthening arm can be selectively disposed along a first side of one of the plurality of supports to position a length of said extending arm along a second forward side of said one support.

7. The device of claim 3 wherein the plurality of supports are positioned adjacent a forward side of the refrigerator and a rearward side of the refrigerator; said testing arm and said lengthening arm being positioned with respect to one another so that said lengthening arm can be selectively disposed along one side of one of the forwardly positioned supports to position a length of said testing arm along a second rearward side of the one forwardly positioned support; said extending arm and said lengthening arm being positioned with respect to one another so that said lengthening arm can be selectively disposed along one side of one of the rearwardly positioned supports to position a length of said extending arm along a second forward side of said rearwardly positioned support and position at least a portion of said testing arm below the fluid connection.

8. The device of claim 1 further comprising a water soluble ink disposed on said head member.

9. The device of claim 1 wherein said head member is comprised of a water absorbing material.

10. A method of detecting a fluid leak from a fluid connection on an appliance that is vertically spaced from a floor by a plurality of forwardly positioned supports and rearwardly positioned supports, comprising the steps of:
   providing a detector having an elongated handle and a head member, having forward and rearward end portions, disposed at one end of said handle; said head member being shaped to have a testing arm which extends outwardly from said handle;
   manipulating said handle to dispose the testing arm of said head member below the fluid connection for a select amount of time;
   manipulating said handle to retrieve said head member away from the fluid connection; and
   checking the head member for the presence of fluid.

11. The method of claim 10 further comprising the step of shaping said testing arm to extend away from a long axis of said handle.

12. The method of claim 11 further comprising the step of providing the rearward end portion of said head member with an extension arm that extends away from the long axis of said handle.

13. The method of claim 12 further comprising the step of providing said head member with a lengthening arm that extends between said testing arm and said extending arm.

14. The method of claim 11 wherein the step of manipulating said handle to dispose the head member adjacent the fluid connection is comprised of sliding said detector between the appliance and the operating surface in a generally forward direction and then sliding said device laterally to dispose said testing arm below the fluid connection.

15. The method of claim 13 wherein the step of manipulating said handle to dispose the head member adjacent the fluid connection is comprised of first sliding said head member at least partially between the appliance and the operating surface, then sliding said head member in a generally lateral direction to position at least a portion of said testing arm behind a forwardly disposed support, then sliding said device in a generally rearward direction until at least a portion of said testing arm is positioned below the fluid connection.

16. The method of claim 10 further comprising the step of disposing a water soluble ink on said head member prior to the step of manipulating said handle to position said head member below the fluid connection.

17. The method of claim 10 further comprising the step of removing a portion of said handle after the step of manipulating said handle to position said head member below the fluid connection, so that little, if any, of the handle extends out from between the appliance and the operating surface.

18. A device for detecting a fluid leak from a fluid supply connection to an appliance that is supported above an operating surface by a plurality of supports, the device comprising:

an elongated handle having a long axis that extends between first and second end portions;

a head member having forward and rearward end portions and upper and lower surfaces; said rearward end portion being operatively coupled to the second end portion of said handle; and a water soluble link disposed on said head member;

said handle and said head member being sized to be selectively disposed between the appliance and the operating surface;

said head member being shaped so that at least a portion of said head member can be positioned first between the appliance and the operating surface and then below the fluid supply connection.

19. A device for detecting a fluid leak from a fluid supply connection to an appliance that is supported above an operating surface by a plurality of supports, the device comprising:

an elongated handle having a long axis that extends between first and second end portions; and a head member having forward and rearward end portions and upper and lower surfaces; said rearward end portion being operatively coupled to the second end portion of said handle; said head member being comprised of a water absorbing material;

said handle and said head member being sized to be selectively disposed between the appliance and the operating surface;

said head member being shaped so that at least a portion of said head member can be positioned first between the appliance and the operating surface and then below the fluid supply connection.

* * * * *